United States Patent [19]
Hoffman, II et al.

[11] Patent Number: 6,061,068
[45] Date of Patent: May 9, 2000

[54] METHOD AND APPARATUS FOR PROVIDING SYNTHETIC VISION USING REALITY UPDATED VIRTUAL IMAGE

[75] Inventors: Richard G. Hoffman, II; Gregory S. Hawkins, both of Plano, Tex.

[73] Assignee: Raytheon Company, Lexington, Mass.

[21] Appl. No.: 09/108,934

[22] Filed: Jun. 30, 1998

Related U.S. Application Data

[60] Provisional application No. 60/051,511, Jul. 2, 1997.

[51] Int. Cl.$^7$ ...................................................... G06F 15/00
[52] U.S. Cl. ............................................................. 345/433
[58] Field of Search ................................... 345/433, 435, 345/113, 114, 117, 118

[56] References Cited

U.S. PATENT DOCUMENTS

| | | | |
|---|---|---|---|
| 4,464,543 | 8/1984 | Kline et al. | 340/286 |
| 4,608,656 | 8/1986 | Tanaka et al. | 364/449 |
| 5,001,558 | 3/1991 | Burley et al. | 358/113 |
| 5,414,439 | 5/1995 | Groves et al. | 345/7 |
| 5,528,735 | 6/1996 | Strasnick et al. | 395/127 |
| 5,729,016 | 3/1998 | Klapper et al. | 250/334 |

FOREIGN PATENT DOCUMENTS

| | | |
|---|---|---|
| 0476959A2 | 3/1992 | European Pat. Off. . |
| 4032927A1 | 4/1992 | Germany . |
| WO9408312 | 4/1994 | WIPO . |

OTHER PUBLICATIONS

Michael Bajura, et al., "Merging Virtual Objects with the Real World: Seeing Ultrsound Imagery within the Patient", Computer Graphics, 26, Jul. 2, 1992, pp. 203–210.

David Hughes, "NASA Pilots Test Windowless Cockpit", Aviation Week & Space Technology, Mar. 11, 1996, p. 38.

Joseph C. Anselmo, "Commerical Imagery Aids Bosnian Peace Mission", Aviation Week & Space Technology, Feb. 5, 1996, p. 60.

Joseph Anselmo, "Satelite Data Plays Key Role in Bosnia Peace Treaty", Aviation Week & Space Technology, Dec. 11, 1995, p. 29.

Mathematics and Information Services "Automated Registration of Images from Multiple Sensors", Laser Tech Briefs, Winter 1994, p. 68.

H. Möller, et al. "Synthetic Vision for Improving Flight Control in Night, Poor Visibility and Adverse Weather Conditions", 1993 IEEE, pp. 286–291.

*Primary Examiner*—Phu K. Nguyen
*Attorney, Agent, or Firm*—Baker Botts L.L.P.

[57] ABSTRACT

An airplane (11) includes a system (10) which provides synthetic vision using a reality updated virtual image. The system includes a processor (17) which receives real-time image information regarding a scene of interest from a sensor (12), the sensor being supported on the airplane by a gimbal (13). The processor receives information regarding the orientation of the sensor from the gimbal, and receives navigational information regarding the airplane from a navigation system (14). The processor maintains virtual image information (23) regarding the scene of interest. The processor updates the virtual image information using the real-time image information, in a manner which improves the quality of the representation in the virtual image information of the scene of interest. The processor prepares combined image information (24, 31), by selectively combining information from the real-time and virtual image information.

19 Claims, 4 Drawing Sheets

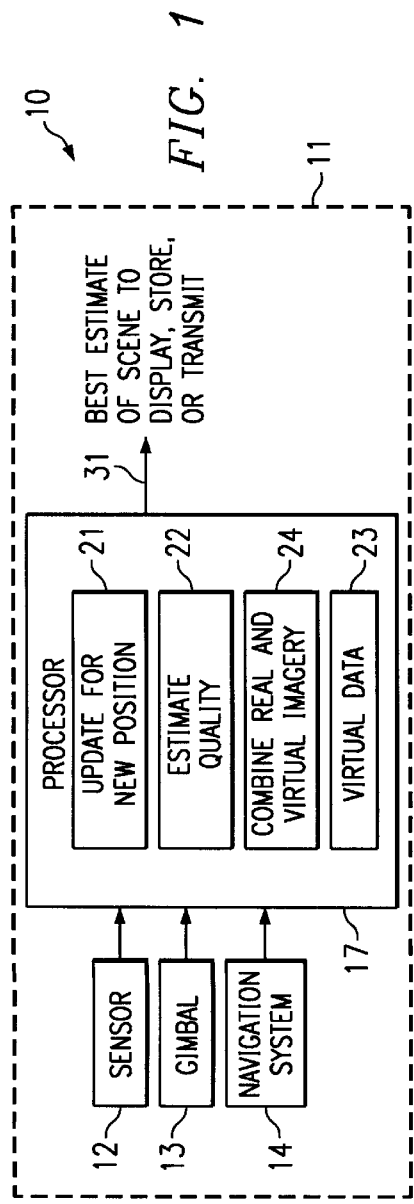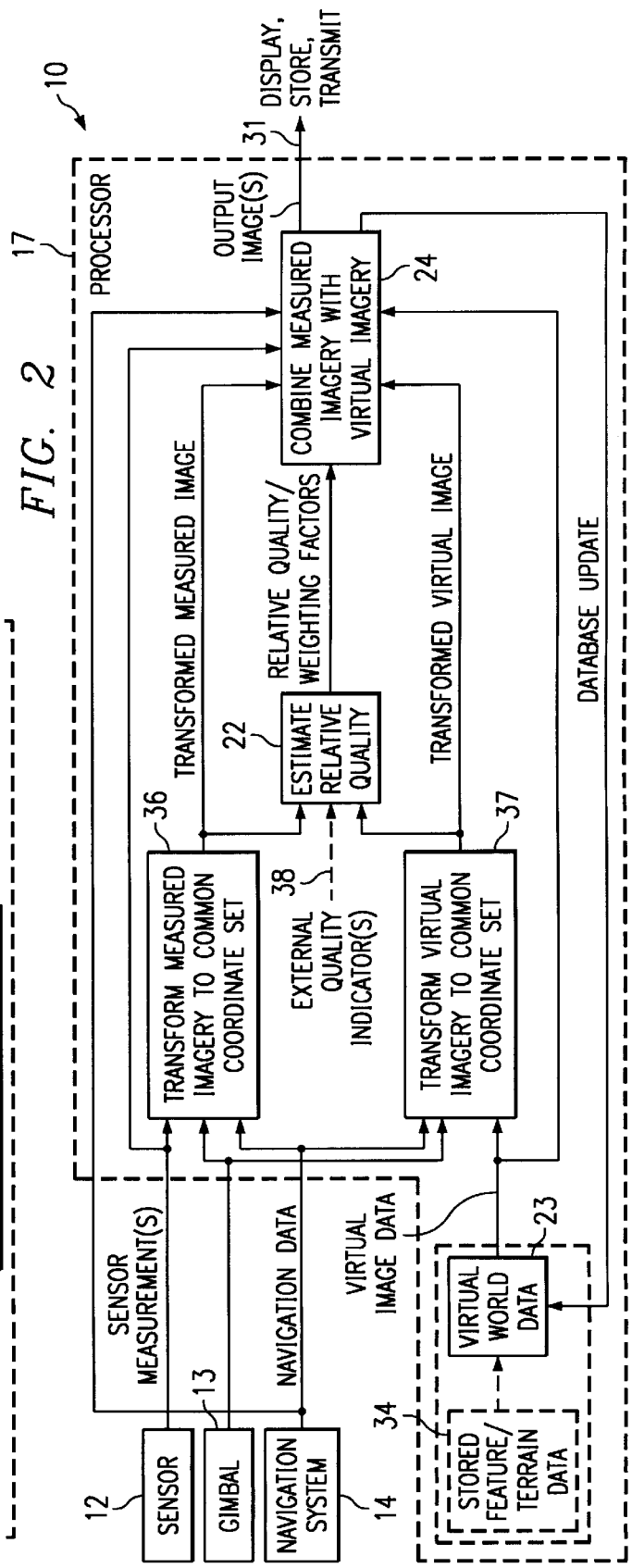

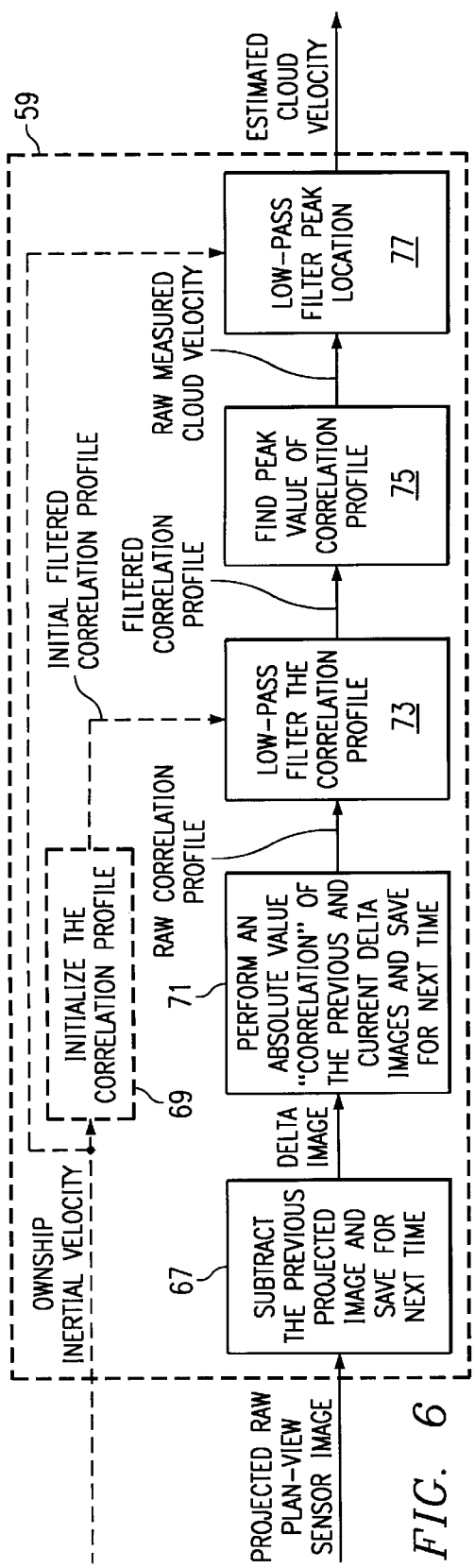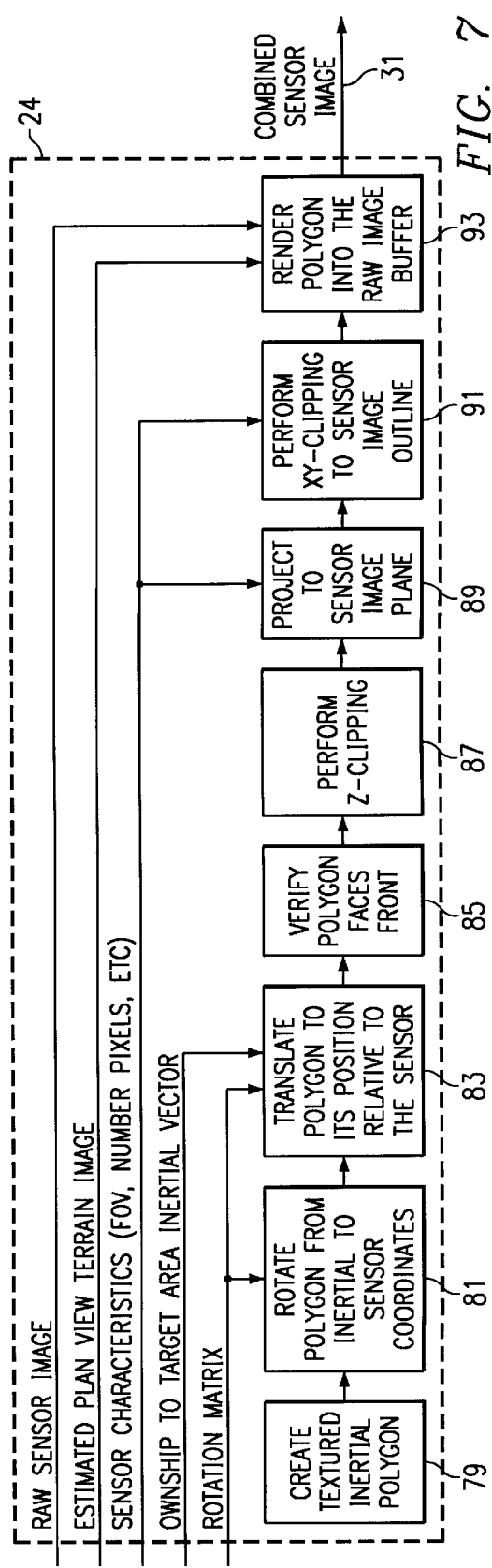

6,061,068

METHOD AND APPARATUS FOR PROVIDING SYNTHETIC VISION USING REALITY UPDATED VIRTUAL IMAGE

This application claims the priority under 35 U.S.C. § 119 of provisional application number 60/051,511 filed Jul. 2, 1997.

TECHNICAL FIELD OF THE INVENTION

This invention relates in general to the provision of an image of a scene using information from a sensor and, more particularly, to a method and apparatus for providing an accurate image of a scene even if a portion of the scene is not clearly observable by the sensor.

BACKGROUND OF THE INVENTION

One of the current major problems for aircraft, commercial as well as military, is that of providing maximum operational capability under adverse weather conditions. For both commercial and military aircraft, two of the primary limitations are the ability to navigate, and the ability to see a target within a scene. The target may, for example, be the end of the runway during landing, or a military target under attack and/or observation.

Several methodologies have been and/or presently are used or are under consideration for improving the ability of airborne aircraft systems to operate under adverse weather conditions. One such methodology is to navigate and, in the case of military aircraft, deliver weapons using radar. This methodology has at least two significant disadvantages. First, it is dependent upon active sensors which, in the case of military aircraft, increase the vulnerability of the sensor-containing airborne system to adverse detection systems. Second, radar systems generally have relatively poor resolution, especially those that operate in real time.

Another methodology is the use of optical sensors, such as infrared (IR) sensors, under the assumption that the airborne system can operate below the significant adverse weather conditions for the final approach to the runway or target. However, such systems cannot operate properly when the conditions are too adverse for optical (e.g. infrared) use.

Attempts have been made and are ongoing to combine radar and infrared imagery for use by the operator of an airborne system. One such alternative is to obtain a snapshot synthetic aperture radar (SAR) map far out from the target, and then use the IR imagery to enhance the SAR map. A further such proposal has been to transform the SAR map and to combine it with the real-time IR imagery in order to enhance the ability of the operator to discriminate targets from clutter. These attempts may provide better information than the above-described systems which use radar alone or infrared sensors alone. However, adverse weather can still negate or substantially diminish the ability to obtain useful information from IR sensors or from other types of sensors, including radar. A different methodology from those practiced and/or presently contemplated by the prior art is required for the next generation of target-viewing airborne systems, whether the target is an airport runway or military objective.

SUMMARY OF THE INVENTION

From the foregoing, it will be appreciated that a need has arisen for a method and apparatus for providing an accurate image of a scene, even when a portion of the scene is not clearly observable by a sensor arrangement, while realizing the capability for accuracy without requiring the use of an active sensing arrangement. According to the present invention, a method and apparatus are provided to address this need, and involve: causing a sensor to generate sensor image information which includes information representative of subject matter of interest and information representative of other subject matter; maintaining virtual image information, including the step of separately maintaining first virtual information representative of the subject matter of interest and second virtual information representative of the other subject matter; updating the virtual image information using the sensor image information in a manner which improves the quality of the representation of the subject matter of interest in the first virtual information and the quality of the other subject matter in the second virtual information; and preparing combined image information by combining information from the sensor image information with information from the first virtual information, the combined image information including an image of the subject matter of interest.

BRIEF DESCRIPTION OF THE DRAWINGS

FIG. 1 is a block diagram of a system which provides reality updated virtual image synthetic vision in accordance with the present invention;

FIG. 2 is a further block diagram of the system of FIG. 1, in which a portion of the system is shown in greater detail than in FIG. 1;

FIG. 6 is a block diagram showing in more detail a portion of the process which is depicted in FIG. 5, in particular a portion which estimates cloud velocity; and FIG. 7 is a block diagram showing in more detail a portion of the process which is depicted in FIG. 3, in particular a portion which renders an estimated, projected terrain image back to sensor image coordinates.

DETAILED DESCRIPTION OF THE INVENTION

Figure 3:
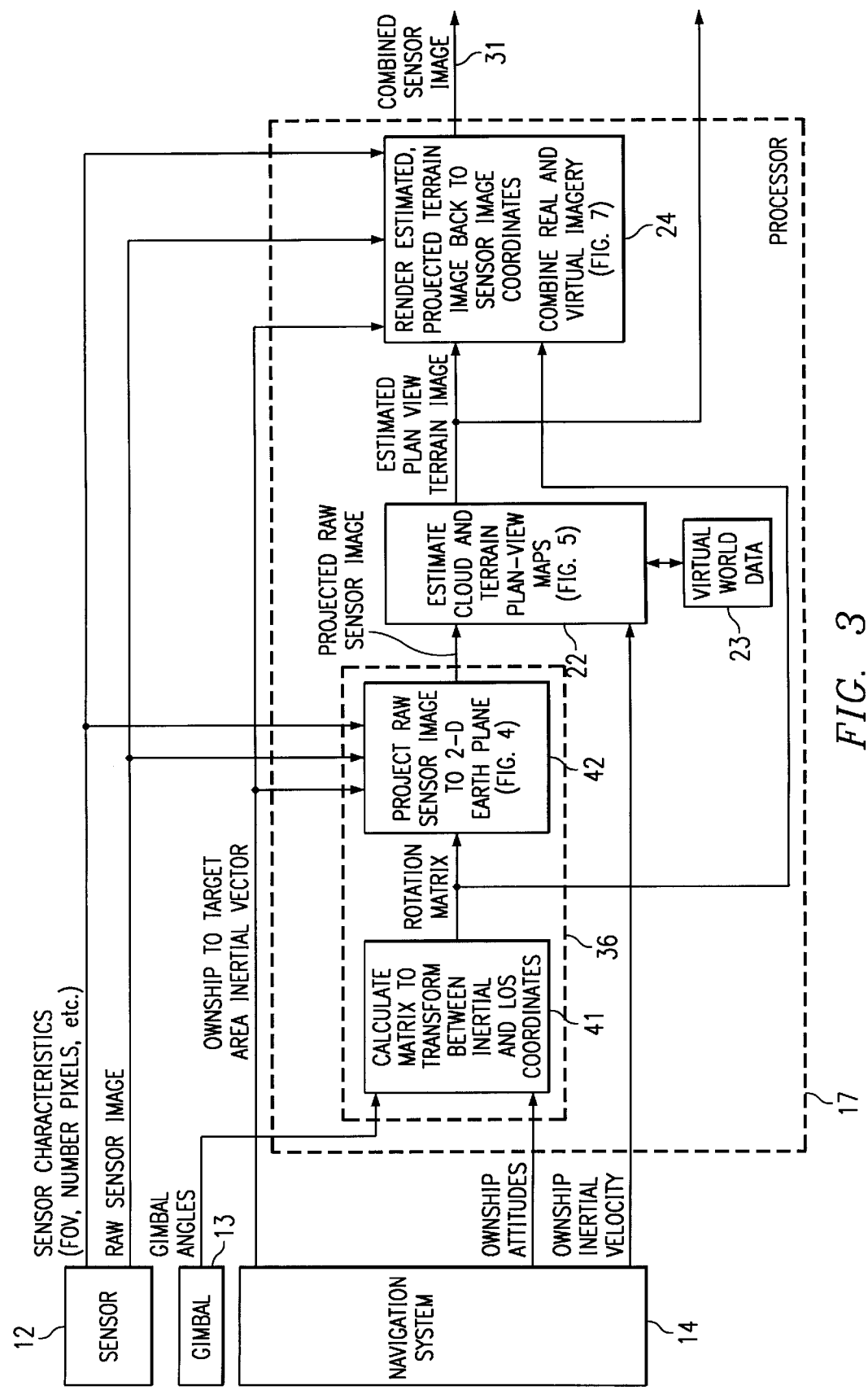
FIG. 3 is still another block diagram of the system of FIG. 1, in which a portion of the system is shown in greater detail than in FIGS. 1 and 2.

FIG. 1 is a block diagram of a system which embodies the present invention. The system 10 produces an image which is a combination of real image information and virtual image information, as discussed in more detail later. In the disclosed embodiment, the system 10 is disposed in an airplane, which is depicted diagrammatically at 11. However, the system 10 could alternatively be provided in some other type of vehicle, or could be used in an application where it is stationarily mounted.

The system 10 includes a sensor 12, a gimbal 13 which supports the sensor 12 for controlled movement relative to the airplane 11, a navigation system 14 for the airplane 11, and a processor 17 which receives and processes outputs from the sensor 12, the gimbal 13 and the navigation system 14. The processor 17 may be a computer of a known type, which includes software for processing the information received from the sensor 12, gimbal 13 and navigation system 14, the software including portions 21–24 which are discussed later. The gimbal 13 is optional, because the sensor 12 could be fixedly mounted on the airplane, so long as the fixed orientation of the sensor relative to the plane is known. However, it is preferable that the gimbal be provided.

The sensor 12 in the disclosed embodiment is a two-dimensional infrared detector, sometimes known as a staring array detector. The sensor 12 could instead be a one-dimensional infrared detector with a scanning mechanism. It would alternatively be possible to use a bank of sensors, or a different type of sensor.

The sensor 12 outputs infrared image information to the processor 17. In the disclosed embodiment, this involves a series of two-dimensional infrared images, each defined by a plurality of pixels. Ideally, the system 10 can successively process each of these images in real time. However, if necessary, the image information from the sensor 12 can be temporally sampled, for example by selecting and processing every other image, and discarding the rest.

The gimbal 13, which movably supports the sensor 12 on the airplane 11, outputs information to the processor 17 which indicates the current orientation of the sensor 12 relative to the airplane 11. The navigation system 14 of the airplane outputs information to the processor 17 which represents the attitude, velocity and location of the airplane relative to a target area or a terrain patch, such as an airport runway.

For purposes of providing a clear explanation of the present invention, it is assumed that the airplane 11 is in a scenario in which it is to land at an airport runway, with only brief periodic samplings available to its sensor of the end of the airport runway and the vicinity thereof. For example, during most of an approach to the runway, the runway and surrounding area may be partly or fully obscured from the sensor by intervening clouds. However, this scenario has been arbitrarily selected, and it will be recognized that there are numerous other scenarios in which the system 10 could be utilized. Moreover, the intervening subject matter could be something other than clouds, such as dust or sand blown by the wind.

The aircraft is equipped with the processor 17, which can receive data from and store data in a virtual data base 23. The virtual data base 23 contains data for displaying the runway target as a function of distance from the runway target and as a function of the orientation of the aircraft relative to the runway target. The aircraft is also equipped with the sensor 12, which provides data for effecting a display of the runway target. The navigation system 14 provides navigation data obtained from GPS, INS and/or on-board instrumentation, and thereby provides location data to the processor 17. The processor 17 accepts the virtual data 23 from the data base, the navigational data from the navigation system 12, and the sensor data from sensor 12, the acceptability of which is evaluated by the quality estimator 22 in a manner described later. The processor uses this information at 21 to update and improve the virtual data 23, and to provide an image 31 of the runway target which can be displayed. In estimating the relative quality of the information from the sensor 12 and the virtual data 23, the quality estimator 22 may consider attributes such as signal to noise ratio, frequency response of the sensor and signal transmission environment, frequency content of the data, and/or other factors.

In the disclosed embodiment, the output image 31 is based on a combination of virtual data 23 and a current image from the sensor 12. The processor 17 uses the virtual data 23 (to the extent that it is available) to create the output image 31, the remainder of the output image 31 being made up of raw data from the current image from sensor 12. The manner in which this is effected is described in more detail later.

Alternatively, however, the output image 31 could be based upon the current image from sensor 12, to the extent that image is acceptable or reliable. To the extent that all information from the sensor 12 appears to be reliable, the scene information as viewed by the sensor 12 may be incorporated into the virtual data 23 for use in the event that virtual data is later required, and the current scene may be provided as the output image 31. On the other hand, if the data from sensor 12 appears to be unacceptable or unreliable for any pixel or group of pixels, the calculated data may be substituted for those pixels. The number of pixels providing unreliable data at any time can be from zero up to the entire scene. The virtual or calculated data is provided by the processor 17 from the virtual data 23, which is based upon the aircraft location, speed and orientation relative to the target at that time, as provided by navigation data from system 14 and prior sensor data, to thereby provide the virtual or expected scene or scene portion. This procedure is repeated at a predetermined rate, which is the rate at which the sensor 12 outputs images. For example, this may be a rate of twenty times per second, with the last reliable data (virtual or real) for each pixel being utilized with mathematical update in place of or in conjunction with the data stored for that pixel from prior scenes. All of these approaches continually provide an accurate real time display and/or data indicative of the scene from the aircraft. This technique substantially improves the safety factor in landing an aircraft under adverse weather conditions.

FIG. 2 is a further diagrammatic view of the system 10 of FIG. 1, which includes a more detailed diagrammatic representation of the software that is executed in the processor 17. In this regard, at system startup, the virtual data may optionally be initialized with predetermined terrain data 34 for the target area of interest. Since this initialization is optional, the predetermined data 34 is shown in broken lines.

The processor 17 executes two transform routines 36 and 37. The transform 36 converts real image information obtained from the sensor 12 to a predetermined coordinate system, and the transform 37 converts virtual data 23 to the same coordinate system. In the disclosed embodiment, the transform 37 is actually unity, and the transform 36 converts the real image information to the coordinate system which is used for the virtual data at 23. The transform 37 is nevertheless shown in FIG. 2, in order to facilitate a better understanding of the present invention.

The relative quality estimator 22 works with the real information from transform 36 and with the virtual information from transform 37, and possibly with optional external quality control indicators 38. The estimator outputs information which is used at 24 to appropriately combine the real information and virtual information, in order to generate the output image 31 containing combined real and virtual information.

In FIG. 2, the on-line navigation (NAV) data from the navigation system 14 may be generated by one or more subsystems such as, but not limited to GPS, INS, on-board instrumentation and the like, whose outputs are position, velocity, attitude, and possibly attitude rate data. This navigation data is normally associated with time tags (time information), in order to support interpolation and extrapolation of the data over time. If the optional stored feature/ terrain data 34 is provided, its contents are used to support the initialization and updating of the virtual data 23. Otherwise, the virtual data 23 is initialized to be either a bland scene or a scene which is consistent with the initial data from the sensor 12.

In conjunction with the navigation data from navigation system 14, the data received from the sensor 12 and from the virtual data 23 are transformed to the common coordinate system by blocks 36 and 37, respectively. If this common coordinate system is identical to either the coordinate system used by the sensor 12 or the virtual data 23, then the corresponding transformation in block 36 or block 37 will be the identity transformation, and the sensor measurements or virtual image data will be passed through essentially unaltered. The transformed sensor data and the transformed virtual image are provided to block 22, which estimates the quality of the transformed sensor data and the transformed virtual image data, and provides estimated quality and weighting factors to the block 24. Block 24 updates the virtual data 23, and provides the output image 31 for display, for storage, or for transmission to one or more external systems, such as an automatic target cuer or an automatic target recognizer.

FIG. 3 is a diagrammatic view similar to FIGS. 1 and 2, but showing the software executed by processor 17 in more detail. Also, FIG. 3 reflects the fact that, in the disclosed embodiment, the transform 37 of FIG. 2 is selected to have a transfer function which is effectively unity. Thus, only the transform 36 is depicted.

The target area is represented within the computer in a three-dimensional coordinate system, which is effectively fixed relative to the earth. For convenience, this local level coordinate frame is referred to in this description as the inertial coordinate frame. The sensor 12 has associated with it a three-dimensional line of sight (LOS) coordinate frame, which is fixed relative to the sensor 12 and has one axis perpendicular to the sensing plane of the sensor 12. The airplane or other platform on which the gimbal 13 supports the sensor 12 is referred to herein as an "ownship". The gimbal 13 is used to orient the sensor 12 relative to the ownship so that the sensor 12 can view a target area on the ground, such as the end of an airport runway. Ownship attitudes from the navigation system 14, and gimbal angle measurements associated with the position of sensor 12, are provided as inputs to block 41 of transform 36. Block 41 uses them to calculate a mathematical 3×3 rotation matrix, which can effect transformations between the inertial coordinate frame and the sensor line-of-sight (LOS) coordinate frame. This rotation matrix is provided to block 42, which uses the matrix, along with the sensor characteristics (such as field of view and the number of pixels in each axis), the vector from the ownship to the target area in the inertial coordinate frame, and the raw (i.e. measured) sensor image, to project the raw sensor image to a two-dimensional ground plane. In this regard, the sensing plane of the sensor 12 will typically not be parallel to the plane which approximates the target area. Therefore, it is the image from the sensor which is effectively projected into the plane of the target area, which is also referred to here as the ground plane. The manner in which this is effected will be described in more detail later.

The projected raw sensor image and the ownship inertial velocity are provided to block 22, which uses them to update the virtual data 23 that represents estimated two-dimensional, gridded plan-view maps of the cloud(s) and terrain. The estimated plan view terrain image is provided as an output for possible display and/or further processing. The rotation matrix, the estimated plan-view terrain image, the sensor characteristics, the ownship to target vector, and the raw sensor image are provided to block 24, which uses them to project the estimated terrain image back to the sensor image frame, and which generates the combined image 31 for display and/or for further processing.

Figures 4, 5:
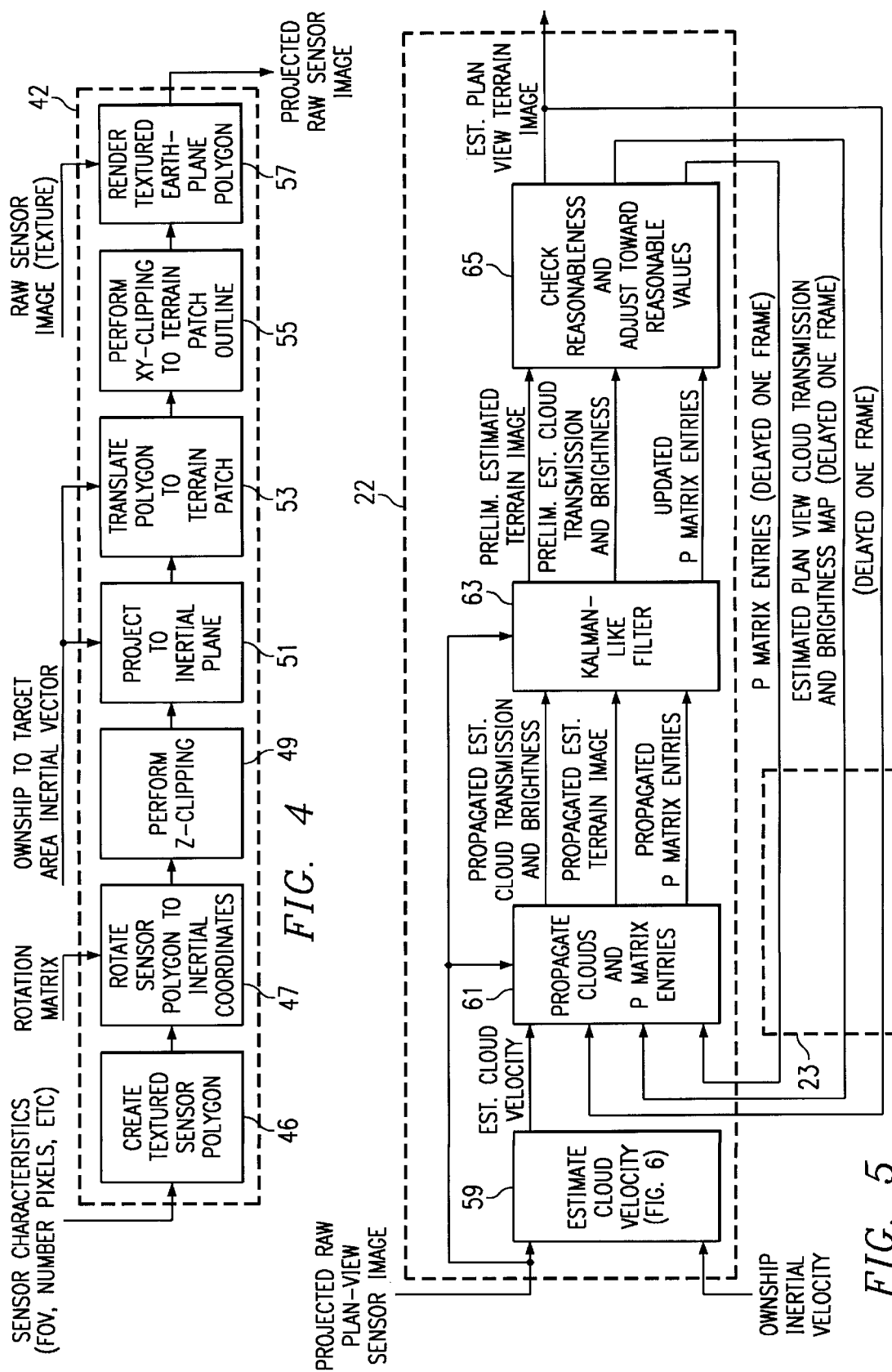
FIG. 4 is a block diagram showing in more detail a portion of a process which is depicted in FIG. 3, in particular a portion which projects a raw sensor image to a two-dimensional earth plane.
FIG. 5 is a block diagram showing in more detail a portion of the process which is depicted in FIG. 3, in particular a portion which maintains a virtual image and which estimates plan-view maps of certain terrain and cloud characteristics.

FIG. 4 is a diagrammatic view showing in more detail the block 42 of FIG. 3. In particular, FIG. 4 depicts a processor graphics operation in which the raw sensor image is interpreted as a texture and is projected to an image grid in the ground plane. The sensor characteristics, including the sensor field of view (FOV) and the number of pixels in each axis, are provided to block 46, which uses them to create a description of a textured polygon in the sensor line-of-sight coordinate frame, where the texture corresponds to the raw (i.e., measured) sensor image. Note that block 46 does not do anything with the actual image, but merely associates the corners of the sensor polygon to the pixel coordinates of the corners of the raw sensor image.

The description of the textured sensor polygon, and the rotation matrix relating the inertial and line-of-sight coordinate frames, are provided to block 47, which uses the matrix to rotate the polygon to the inertial coordinate frame. The resulting polygon is provided to block 49, which performs Z-clipping. Z-clipping is a processor graphics operation in which polygons are tested against near and/or far clipping planes, and then portions of the input polygon which extend beyond the clipping plane(s) are removed or "clipped". Block 49 performs only near-plane clipping. Far-plane clipping is not used in the disclosed embodiment. As one example of Z-clipping, a portion of a sensor image may represent part of the sky, which cannot properly be translated into the portion of the ground plane which corresponds to the target area. Accordingly, this portion of the sensor image is removed or clipped, and is not translated.

The Z-clipped polygon and the vector pointing from the ownship to the target area in the inertial coordinate frame are provided to block 51, which projects the polygon to the two-dimensional inertial ground plane. Stated differently, the polygon's three-dimensional coordinates are converted to two-dimensional coordinates in the ground plane. The projected polygon and the vector pointing from the ownship to the target area in the inertial coordinate frame are provided to block 53, which translates the projected polygon coordinates to the two-dimensional patch of terrain whose appearance is being estimated.

The translated polygon is then provided to block 55, which performs XY-clipping to the outline of the terrain patch. XY-clipping is a processor graphics operation similar in some respects to the Z-clipping described above. In XY-clipping, those portions of the input polygon which lie outside a bounding rectangle (in this case the outline of the terrain patch) are clipped off before the resulting polygon is provided as an output. Stated differently, the target area or terrain patch of interest has a known bound, and portions of the translated input polygon which lie outside that bound are clipped or removed from the input polygon. The XY-clipped polygon, as well as the raw sensor image, are then provided to block 57, which renders the projected raw sensor image onto a two-dimensional grid in the ground plane. Stated differently, there will typically not be a one-to-one pixel alignment between the raw sensor image and the target area, and block 57 therefore performs an interpolation or comparable operation in order to translate information from the pixel format of the sensor image into the pixel format of the target area and the ground plane.

FIG. 5 is a block diagram which shows in more detail the operation of the blocks 22 and 23 in FIG. 3. More specifically, FIG. 5 describes how the projected raw sensor image is used to update the estimated plan-view terrain image and the estimated plan-view cloud transmission map and cloud brightness map. The preferred embodiment includes a simplified variation of an extended Kalman filter. In this simplified filter, the measurements are the brightness of the pixels (picture elements) in the projected, plan-view sensor image, and the state estimates are elements of three two-dimensional arrays respectively containing estimates of (1) terrain brightness, (2) cloud transmission, and (3) cloud brightness. These arrays can be visualized as three two-dimensional grids, where the cloud transmission and brightness grids can be overlaid on the terrain brightness grid.

In FIG. 5, the projected raw plan-view sensor image and the ownship inertial velocity are provided to block 59, which estimates the cloud velocity in the two-dimensional plane, as described in more detail later. As time progresses, the arrays containing the cloud transmission and cloud brightness estimates are operated upon to simulate the traversal of real clouds across the real terrain. In Kalman filter terminology, this is called "state propagation", and is commonly represented by the matrix equation:

$$\hat{x}_k^- = \phi_{k-1}\hat{x}_{k-1} + \Sigma_{k-1}\upsilon_{k-1}.$$

The preferred embodiment does not implement this operation in matrix form, because it is simpler and faster to explicitly move the components of the cloud transmission array and cloud brightness array, rather than create the $\phi_{k-1}$ matrix (which is described later) and then multiply the $\phi_{k-1}$ matrix by the $\hat{x}_{k-1}$ vector. In this expression, the term $\Sigma_{k-1}\upsilon_{k-1}$ represents the effect of an external control or, more generally, a known input term. In the preferred embodiment, this term is always zero. The term $\hat{x}_{k-1}$ represents the state estimate from the previous time step. The term $\phi_{k-1}$ is commonly called the state propagation matrix or state transition matrix. Its purpose is to propagate (i.e., extrapolate) the previous state estimate to the time of the current measurement. If the matrix 15 equation were used, the $\phi_{k-1}$ matrix would be a sparse matrix consisting of ones and zeros, placed in such a way as to move the components of the cloud transmission array and cloud brightness array in a manner that is consistent with the estimated cloud velocity. However, because it is simpler and faster to explicitly move the elements of the cloud transmission and cloud brightness arrays, the $\phi_{k-1}$ matrix is not created in the preferred embodiment.

Additionally, the edge portions of the two-dimensional cloud transmission and cloud brightness arrays, which represent incoming, previously unseen cloud areas, are initialized with reasonable initial values. The result of the state propagation operation is the propagated (i.e., extrapolated) state estimate, prior to the incorporation of any current measurements. The propagated state estimate vector is referred to symbolically as $\hat{x}_k^-$, where the minus sign in the superscript indicates that it is the propagated state estimate vector, and the k subscript indicates that it is associated with the kth time step.

In Kalman filter theory, there is a P matrix, which is the state estimate error covariance matrix. The elements of the P matrix are also propagated (i.e., extrapolated) in a similar fashion, and a nominal process noise matrix is added to the P matrix at each time step (normally at the video frame rate). The nominal process noise matrix is also commonly called the "plant noise matrix" or, symbolically, $Q^*_{k-1}$, where k is the time step index.

In Kalman filter terminology, this is called "covariance matrix propagation" and is commonly represented by the matrix equation $$P_k^- = \phi_{k-1}P_{k-1}\phi_{k-1} + Q^*_{k-1}$$

In this expression $P_{k-1}$ is the state estimate error covariance matrix from the previous frame. The $\phi_{k-1}$ matrix is the state propagation matrix described above. The $Q^*_{k-1}$ matrix is the process noise matrix with variance values along the diagonal and zeroes elsewhere. The propagated P matrix is referred to symbolically as $P_k^-$, where the minus sign in the superscript indicates that it is the propagated P matrix, and the k subscript indicates that it is associated with the kth time step. The preferred embodiment does not implement this operation in matrix form, because it is simpler and faster to explicitly move the components of the P matrix and add the process noise components, rather than create the $\phi_{k-1}$ matrix and perform the matrix multiplication and matrix addition operations.

As new parts of a cloud enter the area covered by the state estimate grids, and as reasonable initial guesses are generated for the new cloud transmission and cloud brightness values, the corresponding P matrix entries are set to values indicating a high level of uncertainty. These propagation operations are shown as block 61, which uses the cloud velocity from block 59 to effect propagation by an appropriate amount corresponding to the current time step. In more detail, the projected raw plan-view sensor image, the estimated cloud velocity, the estimated plan-view terrain image from the previous frame, the estimated plan-view cloud transmission and brightness map from the previous frame, and the $P_{k-1}$ matrix entries from the previous frame are provided as inputs to block 61, which propagates (i.e., extrapolates) the P matrix entries and the estimated plan-view cloud transmission and brightness map. The projected raw plan-view sensor image is an optional input to block 61. It can be used in creating the initial guesses for incoming cloud characteristics, although this is not strictly necessary.

In the particular hypothetical context used here to explain the present invention, namely that of an airplane landing on a runway, the runway does not move relative to the earth, and the propagation of the estimated terrain image would therefore be zero. However, there are other contexts in which the subject matter of interest may move. For example, the operator will typically have the capability to shift the terrain or target area relative to the earth. In the specific hypothetical context being used in the present discussion, the operator may decide to slide the target area along the earth in order to be able fir to look at a different runway, either at the same airport or at a nearby airport. In this type of situation, the estimated image of the subject matter of interest would need to be appropriately propagated.

The projected raw plan-view sensor image, the propagated P matrix entries, the propagated estimated plan-view cloud transmission map, the propagated estimated plan-view cloud brightness map, and the propagated estimated plan-view terrain image from the previous frame are provided to block 63, which performs a Kalman-like filtering operation in order to update the P matrix entries, and also the state estimates (i.e., the estimated plan-view terrain image, the estimated plan-view cloud transmission map and the estimated plan-view cloud brightness map). The expected measurement at each pixel on the terrain surface is calculated as:

$$h_{i,j}(\vec{x}) = (\alpha_{i,j}(t_{i,j} - c_{ij}) + c_{ij})(1-\delta x)(1-\delta y) + (\alpha_{i-1,j}(t_{i,j} - c_{i-1,j}) + c_{i-1,j})\delta x(1-\delta y)$$
$$+ (\alpha_{i,j-1}(t_{i,j} - c_{i,j-1}) + c_{i,j-1})(1-\delta x)\delta y + (\alpha_{i-1,j-1}(t_{i,j} - c_{i,j-1}) + c_{i-1,j-1})\delta x^* \delta y,$$

where $\vec{x}$ represents a vector containing the entire state estimate vector (terrain brightness, cloud transmission, and cloud brightness), δx and δy represent the fractional offsets in the x and y axes of the cloud transmission and brightness grids relative to the underlying terrain brightness grid, $t_{i,j}$ represents the terrain brightness at the (i,j) grid coordinate (normalized to lie between zero and one), $\alpha_{i,j}$ represents the estimated cloud transmission (in the interval from zero to one) at the (i,j) grid coordinate, and $c_{i,j}$ represents the cloud brightness (normalized to lie between zero and one) at the (i,j) grid coordinate. The $H_k$ matrix (commonly called the "observation matrix") is defined as the matrix composed of partial derivatives of the function h( ) evaluated at the state estimate. These definitions of h( ) and $H_k$ closely follow the definitions used in known extended Kalman filters.

In creating the disclosed embodiment of this invention, one of the main problems was that of creating a design which could be made to run at real-time frame rates. A true extended Kalman filter could reasonably be expected to involve a state estimate vector containing thousands of elements and a state estimate error covariance matrix (the P matrix) containing millions of elements. This approach would thus be computationally burdensome. The P matrix used in the disclosed embodiment is therefore considerably simplified as compared to a conventional extended Kalman filter.

In particular, the assumption is made that the only non-zero off-diagonal elements of the P matrix are the covariance terms relating cloud brightness to cloud transmission at the same grid point. That is, the only elements of the P matrix which are allowed to assume non-zero values are the estimated variances of the errors in the terrain brightness estimates, the estimated variances of the errors in the cloud brightness estimates, the estimated covariance between the errors in the cloud brightness estimates and the corresponding cloud transmission estimates, and the estimated variances of the errors in the cloud transmission estimates.

Based on these simplifying assumptions about the nature of the P matrix, it is possible to compute a gain vector K which is analogous to the Kalman gain:

$$K_k = P_k^- H_k^T (H_k P_k^- H_k^T + R_k)^{-1},$$

where the $P_k^-$ matrix is constrained to be sparse as described above (thereby eliminating most of the computational load), H is the observation matrix, and R is a scalar representing the expected variance of the measurement error. The state estimates are updated as follows:

$$\hat{x}_k = \hat{x}_k^- + K_k(z_k - h(\hat{x}_k^-)).$$

The elements of the P matrix which are allowed to be non-zero are updated in accordance with the following matrix equation:

$$P_k = P_k^- - K_k H_k P_k^-.$$

elements of $P_k^-$ and $P_k$ which are constrained to always equal zero are ignored. In fact, no storage space is allocated for the elements of P which are assumed to always equal zero. For each time step (where a time step is normally the inverse of the video frame rate), the propagation operations of block 61 are performed only once (and operate over the entire state vector and P matrix) However, the calculations in block 63 of h( ), $H_k$, $K_k$, $\hat{x}_k$, and $P_k$ are done pixel-by-pixel many times per time step, so that the innovation covariance matrix $(H_k P_k^- H_k^T + R_k)$ will in fact be simply a scalar quantity. This avoids inverting a large matrix, thereby lowering the processor throughput requirements and permitting a design that can run at video frame rates.

For various reasons, the outputs of the Kalman-like filter have to be limited and adjusted toward reasonable values, or the filter outputs may tend to diverge. The preliminary estimated terrain image, the preliminary estimated cloud transmission map, the preliminary estimated cloud brightness map, and the updated P matrix entries are therefore provided to block 65, which adjusts the state estimates toward reasonable values, limits the state estimates to guarantee that they lie between minimum and maximum limits, keeps the P matrix diagonal entries from becoming too large, and limits the magnitudes of the off-diagonal elements of the P matrix (based on the expected error variance values along the P diagonal), in order to force the P matrix to remain positive definite. The term "positive definite" refers to a matrix property, where an n row by n column matrix M containing only real elements is said to be positive definite if and only if $x^T M x > 0$ for every non-zero, real, n row by one column vector x. The P matrix is supposed to represent the state estimate error covariance, and covariance matrices are always positive semidefinite (i.e., $x^T M x \geq 0$). It is common practice in implementing Kalman filters to constrain the P matrix in a manner similar to this in order to guard against numeric errors (such as underflow) in the P matrix calculations, which might lead to problems in the filter operation. One output of block 65 is the estimated plan view terrain image.

FIG. 6 is a diagrammatic view showing in more detail the operation of the block 59 in FIG. 5, which estimates the cloud velocity. The projected raw plan-view sensor image is provided to block 67. Block 67 saves the current input image, and subtracts its previous input image from the current input image, producing a delta image that is the difference between successive frames. This delta image is provided to block 71, which saves the current delta image, and which performs a two-dimensional correlation-type operation between the current delta image and the previous delta image. This correlation-type operation may be a true two-dimensional sum-of-products type of correlation, or it may be a similar mathematical operation, such as summing the absolute values of the differences between the pixels in the sequential delta images. As one specific example, the correlation may be effected by carrying out a Fourier transformation of each of the current delta image and the previous delta image, multiplying the result of one Fourier transformation by the Hermitian of the result of the other, and then carrying out an inverse Fourier transformation on the product. Block 71 saves the current delta image so that it can be used during the next frame. Block 71 provides a raw correlation profile (i.e., a two-dimensional array) to block 73.

Block 69 accepts the ownship inertial velocity and initializes the filtered correlation profile at startup, for later use by block 73 during the first correlation after startup. Block 69 is not strictly necessary for the operation of the cloud velocity estimator, because the filtered correlation profile array could simply be initialized to zero, and the filter would still work. Therefore, since block 69 is optional, it is shown in broken lines. However, the initial operation of the cloud velocity estimator will tend to go more smoothly with the aid of the block 69. Block 73 accepts the initial filtered correlation profile and the raw correlation profile, and low-pass filters the entire two-dimensional correlation profile. In essence, block 73 eliminates temporal spikes in order to smooth out the two-dimensional correlation profile.

The filtered correlation profile is provided to block 75, which detects the peak (maximum or minimum, depending on the implementation) in the filtered correlation profile array, and interpolates the peak location to fractional pixel resolution. In a sense, when preparing the correlation profile, block 71 effects a form of comparison of the current delta image and the prior delta image in each of a number of different positions relative to each other. Then, block 75 effectively selects the peak correlation value, in order to identify the particular relative positioning which provides the closest match between the current delta image and the prior delta image.

The interpolated peak location (i.e the apparent change in cloud position between successive images) is provided as the raw measured cloud velocity to block 77, which low-pass filters the raw value in order to produce the final estimated cloud velocity. In essence, block 77 eliminates temporal glitches in the location within the two-dimensional array which block 75 identifies as the peak value. Optionally, block 77 can also receive the ownship inertial velocity, in order to initialize and/or aid the low-pass filtering operation. Use of the ownship inertial velocity is not strictly required, but is advantageous. Since this connection is optional, it is shown in broken lines in FIG. 6.

FIG. 7 is a diagrammatic view which shows in greater detail the operation of block 24 in FIG. 3. FIG. 7 depicts a processor graphics operation in which the estimated, projected terrain image is interpreted as a texture and is projected to the sensor image plane. In more detail, block 79 creates a description of a textured polygon in the inertial coordinate frame, where the texture corresponds to the estimated, projected terrain image. Block 79 does not use the actual image, but merely associates the corners of the inertial polygon with the pixel coordinates of the corners of the estimated, projected terrain image. The description of the textured inertial polygon and the rotation matrix relating the inertial and line-of-sight coordinate frames are provided to block 81, which rotates the polygon to the correct angular orientation relative to the sensor coordinate frame. The resulting polygon is provided in inertial coordinates to block 83, along with the rotation matrix and the vector from the ownship sensor to the target area. Block 83 translates the polygon to the correct position relative to the sensor.

The resulting polygon is provided to block 85, which tests the polygon to verify that the rotated, translated terrain image is facing the sensor. Assuming that the terrain image is facing the sensor, the unaltered polygon is provided to block 87, which performs Z-clipping. The Z-clipped polygon and the sensor characteristics (including the sensor field of view and the number of pixels in each axis) are provided to block 89, which projects the polygon to the sensor image plane. The projected polygon and the sensor characteristics are provided to block 91, which performs XY-clipping to the outline of the sensor image. The XY-clipped polygon, as well as the raw sensor image and the estimated projected terrain image, are provided to block 93, which combines the estimated, projected terrain image with the raw sensor image. This operation may replace some or all of the pixels in the raw sensor image with pixels from the estimated or virtual image. Alternatively, it may mix the estimated terrain image with the raw image, either by combining corresponding pixels from the raw image and the estimated terrain image using appropriate weighting factors, or by rendering the estimated terrain image into a different color plane from that used for the raw sensor image. In the disclosed embodiment, block 93 prepares the combined image using pixels derived from the estimated terrain image, to the extent that they are available within the XY-clipped polygon and the target area, and uses pixels from the raw sensor image for portions of the target area which do not correspond to pixels of the clipped, estimated terrain image.

The present invention provides a number of technical advantages. In accord with the present invention, a method and apparatus are provided which minimize the problems inherent in the pre-existing systems discussed above, and which provide a current actual image of the target or, if the target is not fully observable by the sensors, a best estimate image of the target or scene. The best estimate is based at least in part on current and/or prior data obtained from a sensor or group of sensors, the group of sensors being of the same type or a different type. The best estimate is displayable on a normal display, a head-up display, or a helmet-mounted display, and/or the estimate can be provided to a processor for storage, target recognition, or cueing. The position and velocity of the sensor relative to the target are used to extrapolate the estimate forward in time when sensor scene information is either not available or not totally available.

Stored data base information such as, for example, a digital map, may be displayed separately, and/or may be fused (for example in the form of an overlay) with the other scene data, such as from the sensor system. The best estimate of the scene from the present location of the airborne system will be displayed, even when clouds obscure the scene and prevent sensing thereof in whole or in part, thereby providing a capability closer to the all-weather ideal.

While the foregoing description of the invention has been presented in the specific context of a manned aircraft, the invention can also be used in other applications, such as autonomous or remotely piloted aircraft, on-board or off-board processing of data from orbiting satellites, and observation of underwater objects obscured by waves moving across the surface of the water. Such systems are contemplated to be within the scope of the present invention.

The invention provides a data base containing a description of a "virtual world", which can be displayed to an operator and/or provided to a processor for storage, target recognition, or cueing. As the sensor arrangement moves through space (in both the linear and angular sense), this data base, in conjunction with updated navigation information, provides data for extrapolating the change that would take place in the scene due to the change in perspective of the sensor used by the airborne system to view the target. As new sensor measurements arrive, the stored data base is continually updated and operated upon by the processor to provide a best estimate of the scene. In the event that the data from the sensor arrangement becomes unreliable, for example when a cloud obscures all or a part of the scene, the virtual scene can be substituted for any portion of the current sensor data which is deemed unreliable. In the event that data from the sensor arrangement is deemed reliable, it is used to refine the data base which describes the stored virtual world. In this case, either the virtual scene, the sensor data, or a combination of the two may be displayed or used for further processing. In this way, and assuming for the sake of example that a cloud temporarily intervenes and cuts out the IR data stream, the operator will continue to be provided with an estimated current display of the target area in the appropriate geometry from the present location of the airborne system, this being a "virtual real time image" of the scene and/or target. The scene or target can also be identified or classified from this data.

If two or more different sensor systems are available (for example two different EO sensor systems, or an IR sensor system and a radar sensor system), the data from each sensor system is transformed to a common coordinate set, and the data from the two sensor systems is then fused and displayed or stored in order to present a single scene and/or target. Alternatively, the data from each sensor system may be displayed in an overlaid state, for example in two different colors on a CRT, and/or may be stored in such state in a processor. When fusing the data from two different sensor systems, data for pixels from each system which represent the same portion of a scene is analyzed and combined in a weighted manner, the weighting depending upon the relative reliability of the common pixels from the two sensor systems. For example, some of the considerations for an attack scenario in adverse weather, which could influence the method chosen for sensor fusion, are (1) that the use of active sensor systems should be minimized in order to minimize vulnerability, (2) that the typical adverse weather conditions will be sufficiently intermittent to permit at least occasional access to the target, and (3) that the rate of change of information should be sufficiently low (compared to the display rate) to allow time for processing of the information received from the sensors.

Although the invention has been described in the context of one specific preferred embodiment, those skilled in the art will recognize many variations and modifications, which fall within the scope of the invention as defined by the following claims. Although the disclosed embodiment combines sensor and virtual information at 24 in FIG. 2, it would alternatively be possible to eliminate the use of sensor information at 24, and to create output 31 directly from the virtual information alone.

What is claimed is:

1. A method, comprising the steps of:
   causing a sensor to generate sensor image information which includes information representative of subject matter of interest and information representative of other subject matter;
   maintaining virtual image information, including the step of separately maintaining first virtual information representative of the subject matter of interest and second virtual information representative of the other subject matter;
   updating the virtual image information using the sensor image information in a manner which improves the quality of the representation of the subject matter of interest in the first virtual information and the quality of the other subject matter in the second virtual information; and
   preparing combined image information by combining information from the sensor image information with information from the first virtual information, the combined image information including an image of the subject matter of interest.

2. A method according to claim 1, including the step of providing a display of the combined image information.

3. A method according to claim 1, wherein the sensor image information includes a succession of images, and wherein said updating and preparing steps are carried out for each of the images in the sensor image information.

4. A method according to claim 1, wherein said preparing step is carried out by overlaying a portion of the sensor image information and a portion of the first virtual information.

5. A method according to claim 1, wherein said preparing step is carried out by selectively substituting pixels from one of the sensor image information and the first virtual information for corresponding pixels in an image from the other thereof.

6. A method according to claim 1, wherein said updating step includes the steps of detecting, in the sensor image information, moving subject matter which is moving relative to the subject matter of interest as viewed by the sensor, and which is located between the sensor and the subject matter of interest, the other subject matter including the moving subject matter.

7. A method according to claim 6, including the step of providing the sensor in an aircraft, the subject matter of interest being disposed on the earth and the moving subject matter including clouds.

8. A method according to claim 7, wherein said updating step includes the steps of maintaining in the second virtual information an estimated image of the cloud brightness and an estimated image of the cloud transmissivity, and maintaining in the first virtual information an estimated image of the subject matter of interest.

9. A method according to claim 8, wherein said updating step includes the step of maintaining a state estimate error covariance matrix.

10. A method according to claim 1, including the step of effecting relative movement between the sensor and the subject matter of interest.

11. A method according to claim 1, wherein the sensor image information and the virtual image information are respectively expressed in sensor and virtual coordinate systems, and including the step of effecting a transformation so that the sensor image information and the virtual image information are expressed in a common coordinate system.

12. A method according to claim 11,
    wherein said step of effecting a transformation is carried out by transforming the sensor image information from the sensor coordinate system to the virtual coordinate system;
    wherein said updating step is carried out using the transformed sensor image information;
    including the step of thereafter transforming information from the first virtual information from the virtual coordinate system to the sensor coordinate system in order to obtain transformed virtual information; and
    wherein said preparing step is carried out in the sensor coordinate system using the sensor image information and the transformed virtual information.

13. A method according to claim 1, wherein said updating step includes the step of using Kalman-type filtering techniques.

14. An apparatus, comprising:
    a sensor which generates sensor image information that includes information representative of subject matter of interest and information representative of other subject matter; and
    a processor which is responsive to the sensor image information from said sensor, and which is operative to:
        maintain virtual image information, including first virtual information representative of the subject matter of interest and second virtual information representative of the other subject matter;
        update the virtual image information using the sensor image information in a manner which improves the quality of the representation of the subject matter of interest in the first virtual information and the quality of the other subject matter in the second virtual information; and prepare combined image information by combining information from the sensor image information with information from the first virtual information, the combined image information including an image of the subject matter of interest.

15. An apparatus according to claim 14, including an airplane having said sensor supported thereon, the subject matter of interest being disposed on the earth, and including a navigational system operative to provide navigational information regarding said airplane to said processor.

16. An apparatus according to claim 15, including a gimbal which movably supports said sensor on said airplane, and which is operative to provide information to said processor which identifies a current orientation of said sensor relative to said airplane.

17. An apparatus according to claim 14, including a display coupled to said processor, said display being operative to provide a visual display of the combined image information.

18. An apparatus according to claim 14, wherein said processor is operative to effect the update of the virtual image information by detecting, in the sensor image information, moving subject matter which is moving relative to the subject matter of interest as viewed by said sensor, and which is located between said sensor and the subject matter of interest, the other subject matter including the moving subject matter.

19. A method, comprising the steps of:

causing a sensor to generate sensor image information which includes information representative of subject matter of interest and information representative of other subject matter;

maintaining virtual image information, including the step of separately maintaining first virtual information representative of the subject matter of interest and second virtual information representative of the other subject matter;

updating the virtual image information using the sensor image information in a manner which improves the quality of the representation of the subject matter of interest in the first virtual information and the quality of the other subject matter in the second virtual information; and preparing output image information which includes information from the first virtual information, the output image information including an image of the subject matter of interest.

* * * * *

UNITED STATES PATENT AND TRADEMARK OFFICE
CERTIFICATE OF CORRECTION

PATENT NO. : 6,061,068
DATED : May 9, 2000
INVENTOR(S) : Richard G. Hoffman, II and Gregory S. Hawkins It is certified that error appears in the above-identified patent and that said Letters Patent is hereby corrected as shown below:

Column 7:
Line 27, after "the" delete "Φk-1" and insert --$\Phi_{k-1}$--.
Line 28, after "the" delete "Φk-1" and insert --$\Phi_{k-1}$--.
Line 37, after "matrix" delete "15".

Column 8:
Line 1, delete "$P_k^- = \phi_{k-1} P_{k-1} \phi_{k-1} + Q_{k-1}^*$"
and insert --$P_k^- = \phi_{k-1} P_{k-1} \phi_{k-1}^T + Q_{k-1}^*$--.

Line 45, after "able" delete "fir".
Line 60, delete $$"h_{ij}(\bar{x}) = (\alpha_{ij}(t_{ij} - c_{ij}) + c_{ij})(1-\delta x)(1-\delta y) + (\alpha_{i-1j}(t_{ij} - c_{i-1j}) + c_{i-1j})\delta x(1-\delta y) +$$
$$(\alpha_{ij-1}(t_{ij} - c_{ij-1}) + c_{ij-1})(1-\delta x)\delta y + (\alpha_{i-1j-1}(t_{ij} - c_{ii-1j-1}) + c_{i-1j-1})\delta x^* \delta y,"$$

and insert $$--h_{i,j}(\bar{x}) = (\alpha_{i,j}(t_{.,j} - c_{i,j}) + c_{i,j})(1-\delta x)(1-\delta y) + (\alpha_{i-1,j}(t_{i,j} - c_{i-1,j}) + c_{i-1,j})\delta x(1-\delta y) +$$
$$(\alpha_{i,j-1}(t_{i,j} - c_{i,j-1}) + c_{i,j-1})(1-\delta x)\delta y + (\alpha_{i-1,j-1}(t_{i,j} - c_{i-1,j-1}) + c_{i-1,j-1})\delta x^* \delta y,--$$

UNITED STATES PATENT AND TRADEMARK OFFICE
CERTIFICATE OF CORRECTION

PATENT NO. : 6,061,068
DATED : May 9, 2000
INVENTOR(S) : Richard G. Hoffman, II and Gregory S. Hawkins It is certified that error appears in the above-identified patent and that said Letters Patent is hereby corrected as shown below:

<u>Column 9:</u>
Line 4, after "grid" delete "$t_{ij}$" and inset --$t_{i,j}$--.
Line 6, after "one" delete "$\alpha_{ij}$" and inset --$\alpha_{i,j}$--.
Line 8, after "and" delete "$c_{ij}$" and inset --$c_{i,j}$--.
Line 58, before "elements" insert --The--.

Signed and Sealed this

Seventh Day of August, 2001

*Attest:*

NICHOLAS P. GODICI
*Attesting Officer*    Acting Director of the United States Patent and Trademark Office